(12) United States Patent
Tsuyoshi

(10) Patent No.: US 6,808,839 B2
(45) Date of Patent: Oct. 26, 2004

(54) FUEL CELL, AND COLLECTOR PLATE THEREOF

(75) Inventor: Takahashi Tsuyoshi, Nishikamo-gun (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 170 days.

(21) Appl. No.: 09/799,045

(22) Filed: Mar. 6, 2001

(65) Prior Publication Data

US 2001/0019793 A1 Sep. 6, 2001

(30) Foreign Application Priority Data

Mar. 6, 2000 (JP) ............................ 2000-060111

(51) Int. Cl.⁷ ................................................ H01M 8/02
(52) U.S. Cl. ............................................ 429/38; 429/39
(58) Field of Search ................................. 429/38, 39

(56) References Cited

U.S. PATENT DOCUMENTS 4,407,904 A * 10/1983 Uozumi et al. ........... 429/39 X
6,048,633 A * 4/2000 Fujii et al. ................ 429/38 X
6,348,280 B1 * 2/2002 Maeda et al. ............... 429/38
6,410,178 B1 * 6/2002 Matsukawa ................. 429/39

FOREIGN PATENT DOCUMENTS

JP  HEI 02-170363   7/1990
JP  HEI 10-106594   4/1998

* cited by examiner

Primary Examiner—Stephen J. Kalafut
(74) Attorney, Agent, or Firm—Kenyon & Kenyon

(57) ABSTRACT

A fuel cell and a collector plate thereof that are able to improve the characteristic of distribution of reaction gasses to gas passages. Each collector plate of the fuel cell has reaction gas-conveying gas passages that are formed in stacking surfaces that face adjacent electrolyte films. Each gas passage is provided with a supply hole for distributing and supplying a reaction gas and a discharge hole for discharging the reaction gas from the gas passage. In a state where collector plates are stacked with electrolyte films placed therebetween, the supply holes connect to form a supply manifold, and the discharge holes connect to form a discharge manifold. The opening area of each discharge hole is set greater than the opening area of each supply hole.

15 Claims, 3 Drawing Sheets

FUEL CELL, AND COLLECTOR PLATE THEREOF

INCORPORATION BY REFERENCE

The disclosure of Japanese Patent Application No. 2000-060111 filed on Mar. 6, 2000 including the specification, drawings and abstract is incorporated herein by reference in its entirety.

BACKGROUND OF THE INVENTION

1. Field of the Invention

The invention relates to a fuel cell that has a stack formed by stacking a plurality of collector plates and a plurality of electrolyte films provided with reaction electrodes, supply manifolds formed in the stack for distributing and supplying reaction gasses to gas passages formed between the electrolyte films and the collector plates, and discharge manifolds into which reaction gases from the gas passages are discharged. The invention also relates to a collector plate of a fuel cell, the collector plate having gas passages, and supply holes and discharge holes for forming the manifolds.

2. Description of the Related Art

A fuel cell has a stack body having a stack structure formed by stacking unit cells. Each unit cell is made up of an electrolyte film carrying reaction electrodes on its both side surfaces, and current collector plates placed at opposite sides of the electrolyte film. A surface of each collector plate facing the adjacent electrolyte film has gas passages for conveying reaction gasses, such as a fuel gas, an oxidant gas, or the like. Inside the stack, supply manifolds and discharge manifolds extend in the stacking direction. The reaction gasses are supplied and discharged between the manifolds and the gas passages of each collector plate. Each manifold is formed as a passage by connecting holes in series that are formed in the collector plates as described in, for example, Japanese Patent Application Laid-Open No. HEI 10-106594. Each collector plate has a plurality of holes that are formed at predetermined positions corresponding to the manifolds.

In this fuel cell, the reaction gasses, supplied from the inlets of the manifolds thereinto, are distributed and supplied into the gas passages of each unit cell via supply manifold-forming supply holes that are formed in the collector plates. After being distributed and supplied into the gas passages, the reaction gasses flow through the gas passages, and then are discharged into the discharge manifolds via discharge manifold-forming discharge holes that are formed in the collector plates. By thus causing the reaction gasses to flow through the gas passages of each unit cell, an electromotive force is generated between the reaction electrodes of each unit cell in an electrochemical reaction manner.

Thus, in the fuel cell, an electromotive force is extracted by causing the reaction gasses to flow through the gas passages of the collector plates. Therefore, in order to achieve a desired electric power generating efficiency in the fuel cell, it is desirable to appropriately control the amount of flow of the reaction gasses and the distribution thereof in the gas passages.

However, in the aforementioned fuel cell in which each reaction gas is supplied and discharged between the corresponding gas passages and the manifolds common to those gas passages, there is an unignorable problem as follows, regarding the amount of flow of each reaction gas and the distribution thereof.

The amount of flow of each reaction gas tends to decrease with increases in the distance of a unit cell from the inlet of the supply manifold. Therefore, whereas sufficient amounts of the reaction gasses are supplied to unit cells that are relatively close to the inlets of the supply manifolds, the amounts of the reaction gasses supplied into the gas passages of unit cells that are relatively remote from the inlets of the supply manifolds become insufficient, and therefore the electromotive forces generated by those unit cells become relatively low. Thus, in the fuel cell in accordance with the relative art, the distribution of each reaction gas to the gas passages is biased, so that some of the unit cells fail to generate a desired electromotive force. Therefore, a reduction in power generating efficiency is inevitable.

SUMMARY OF THE INVENTION

Accordingly, it is an object of the invention to provide a fuel cell and a collector plate thereof that are able to improve the characteristic of reaction gas distribution to the gas passages in the fuel cell.

In order to achieve the aforementioned and other objects, a collector plate of a fuel cell in accordance with an aspect of the invention includes a gas passage formed in at least one surface, a supply hole for distributing and supplying a reaction gas into the gas passage, and a discharge hole for discharging the reaction gas from the gas passage. An opening area of the discharge hole is set greater than an opening area of the supply hole.

In a fuel cell, the reaction gas supplied from the supply hole into the gas passage of each collector plate is discharged via the discharge hole. In this process, the discharge hole tends to function as a constriction, and tends to restrict the flow of the reaction gas. In general, the gas passage of a collector plate located near a supply manifold is supplied with the reaction gas at a relatively high pressure from the supply manifold, so that the reaction gas is relatively rapidly discharged via the discharge hole although the flow is restricted by the discharge hole.

The gas passage of a collector plate located remotely from an inlet of the supply manifold, on the other hand, is supplied with the reaction gas at a relatively reduced pressure. In such a gas passage, therefore, the influence of the constricting effect of the discharge hole becomes great, so that the reaction gas becomes less apt to be discharged. As a result, the amount of the reaction gas supplied to the gas passage via the supply hole becomes less in a collector plate located remotely from the inlet of the supply manifold than in a collector plate located near the inlet.

In the above-described aspect of the invention, however, the restriction on flow by the constricting effect of the discharge hole is reduced, so that the reaction gas can be promptly discharged from the gas passage via the discharge hole. Therefore, even in the case of a collector plate disposed remote from the inlet of the supply manifold, at least a predetermined amount of the reaction gas can be caused to flow through the collector plate. Thus, the bias of distribution of the reaction gas to the gas passages of the unit cells that constitute a fuel cell can be reduced, and the distribution characteristic can be improved.

BRIEF DESCRIPTION OF THE DRAWINGS

The foregoing and further objects, features and advantages of the invention will become apparent from the following description of a preferred embodiment with reference to the accompanying drawings, wherein like numerals are used to represent like elements and wherein.

DETAILED DESCRIPTION OF PREFERRED EMBODIMENT

A preferred embodiment of the invention will be described hereinafter with reference to FIGS. 1 to 4.

Figure 1:
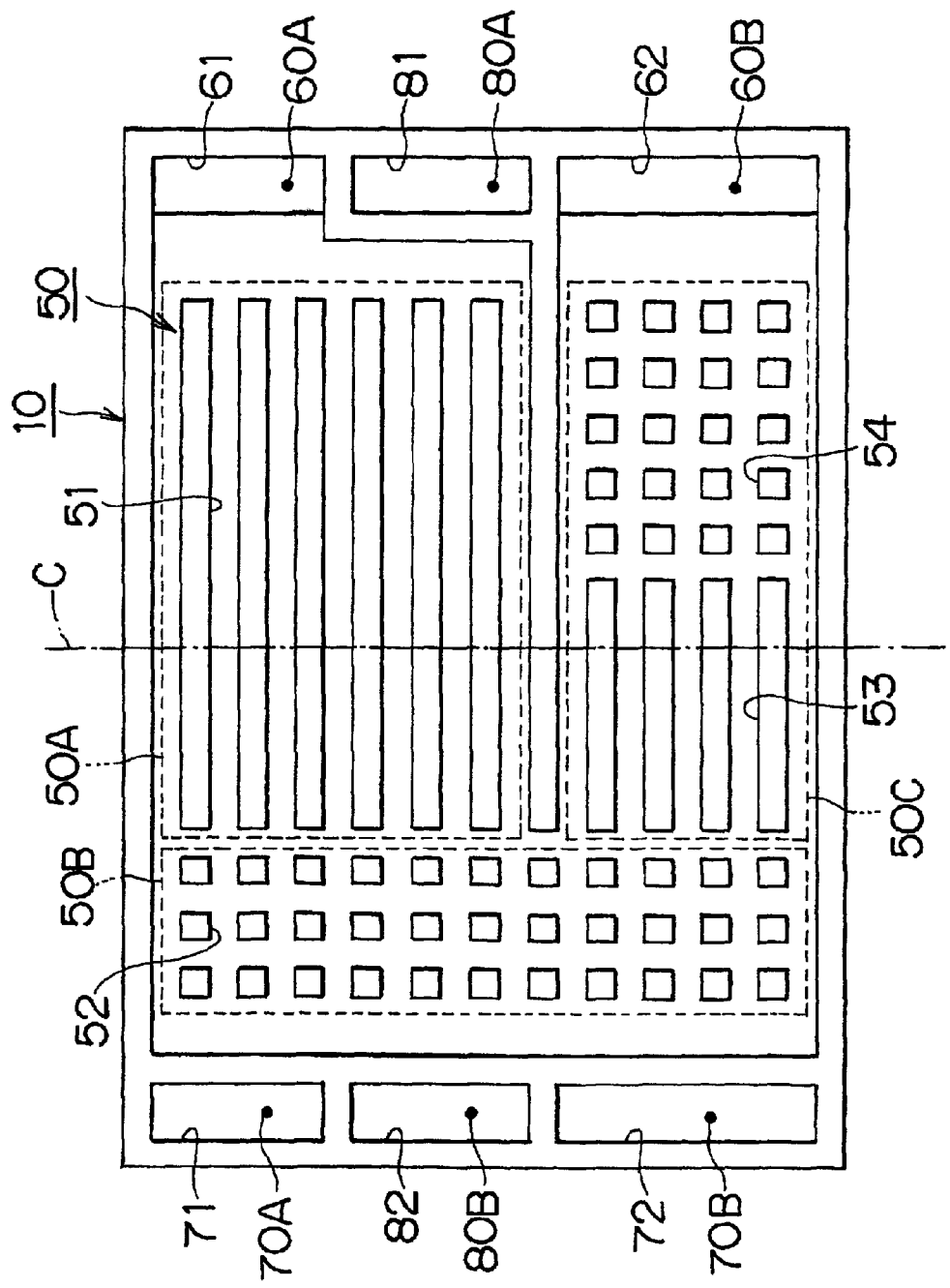
FIG. 1 is a plan view of a collector plate used in a fuel cell in accordance with an embodiment of the invention.
Figure 2:
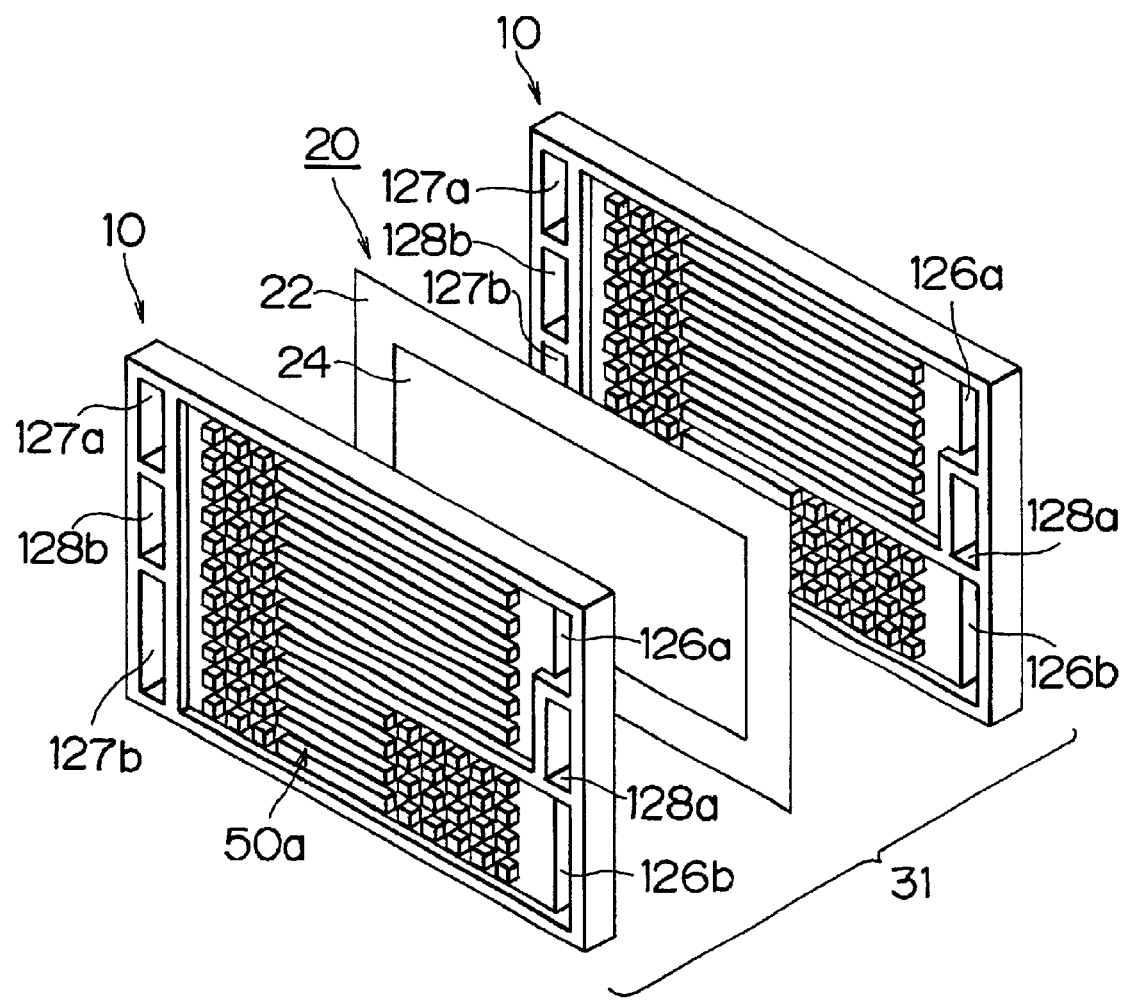
FIG. 2 is an exploded perspective view of a unit cell of the fuel cell.
Figure 3:
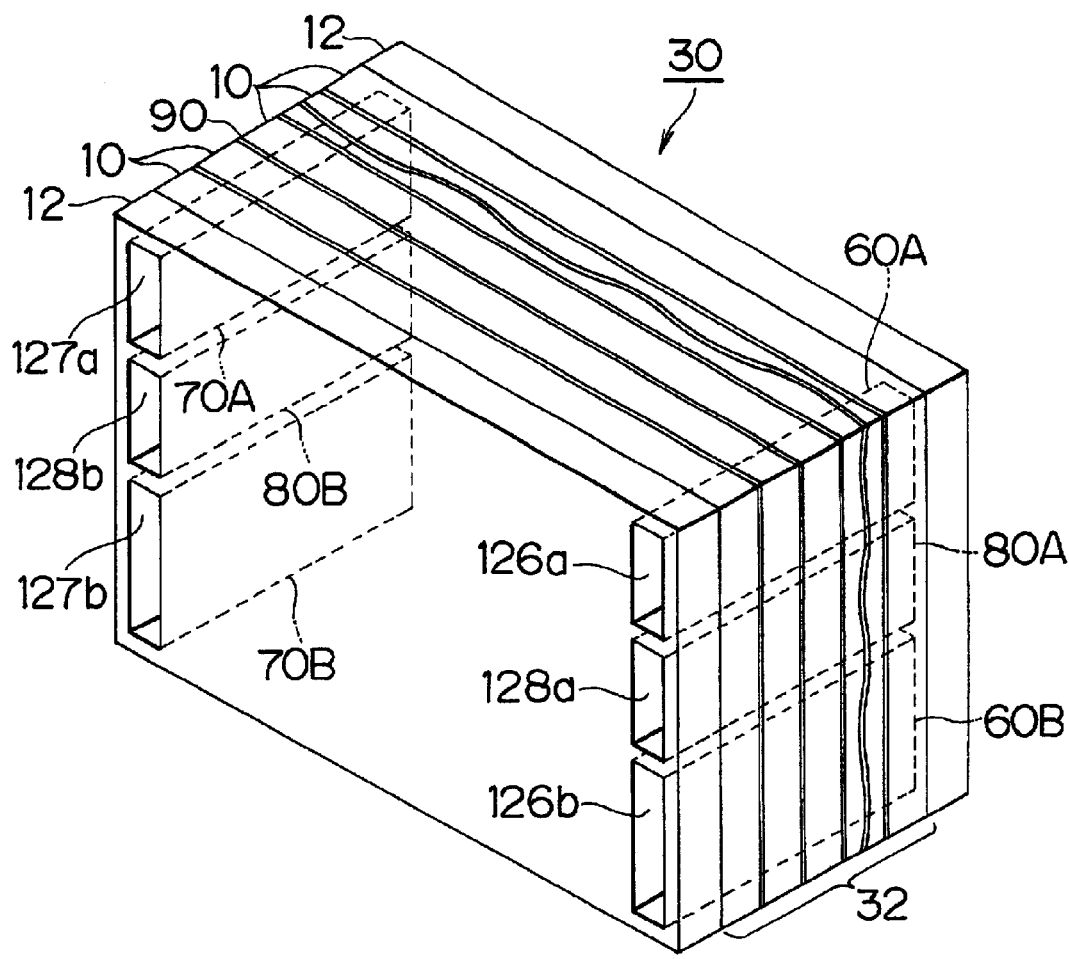
FIG. 3 is a perspective view of the fuel cell.

FIG. 1 illustrates a plan view construction of a collector plate 10 used in a polymer electrolyte fuel cell 30 in accordance with the embodiment. FIG. 2 illustrates an exploded view construction of a unit cell 31 of the fuel cell 30. FIG. 3 illustrates a perspective view construction of the fuel cell 30.

Referring to FIG. 3, the fuel cell 30 includes a stack 32 formed by alternately stacking a plurality of baseboards 20 and a plurality of collector plates 10, and two side plates 12 sandwiching the stack 32 on opposite sides thereof. The stack 32 is disposed so that when the fuel cell 30 is placed in a usable state, the stacking direction of the stack 32 coincides with a direction perpendicular to the direction of gravity (vertical direction in each drawing).

Each baseboard 20 has an electrolyte film 22, and reaction electrodes (a negative electrode and a positive electrode, only one of which is shown in FIG. 2) sandwiching the electrolyte film 22 from opposite sides thereof. The electrolyte film 22 is formed from a macromolecular material, for example, a fluorine-based resin or the like, which exhibits an ion conductivity when in an appropriate wet condition. The reaction electrodes 24 are formed by a carbon fiber that contains a catalyst such as a platinum or the like.

Each collector plate 10, as shown in FIG. 1, is formed from an electrically conductive material, such as carbon or the like, so as to have a generally rectangular platy shape. Each collector plate 10 has a function of electrically connecting the reaction electrodes 24 positioned at opposite sides of the collector plate 10, and also has a function of forming gas passages for supplying the reaction gasses, such as a fuel gas, an oxidant gas or the like, to a surface of each reaction electrode 24. As shown in FIG. 2, each unit cell 31 is formed by a baseboard 20 and collector plates 10 placed on opposite sides of the baseboard 20. The stack 32 has a structure in which the unit cells 31 are electrically connected in series.

Each collector plate 10 has, in a surface thereof facing the adjacent reaction electrode 24, a gas passage 50 (oxidant gas passage) 50 for conveying an oxidant gas (e.g., air) containing oxygen.

As shown in FIG. 1, the gas passage 50 of each collector plate 10 has a generally "U" configuration, that is, extends from a first end portion side (a right end side in FIG. 1) to a second end portion side (a left end side in FIG. 1) of the collector plate 10, and turns around at the second end portion and extends to the first end portion side of the collector plate 10. More specifically, the gas passage 50 is formed by regions enclosed by broken lines in FIG. 1, that is, an upstream-side portion 50A, a turnaround portion 50B, and a downstream-side portion 50C.

The first end portion of each collector plate 10 has a supply hole 61 for supplying the oxidant gas into the gas passage 50, and a discharge hole 62 for discharging the oxidant gas from the gas passage 50. When the fuel cell 30 is placed in a usable state, the supply hole 61 of the two holes 61, 62 is positioned upward in the direction of gravity, and the discharge hole 62 is positioned downward in the direction of gravity.

Of the portions 50A–50C of the gas passage 50 of each collector plate 10, the upstream-side portion 50A and the downstream-side portion 50C are connected to the supply hole 61 and the discharge hole 62, respectively. Therefore, the reaction gas (oxidant gas), supplied into the gas passage 50 via the supply hole 61, sequentially flows through the upstream-side portion 50A, the turnaround portion 50B, and the downstream-side portion 50C, and then is discharged from the gas passage 50 via the discharge hole 62.

The upstream-side portion 50A of each gas passage 50 is formed as a plurality of independent passages by a plurality of parallel grooves 51. The turnaround portion 50B is formed as a grating-like passage by a plurality of grating grooves 52. A portion of the downstream-side portion 50C adjacent to the turnaround portion 50B is formed as a plurality of independent passages by a plurality of parallel grooves 53, and a portion of the downstream-side portion 50C located farthest downstream, that is, a portion thereof adjacent to the discharge hole 62, is formed as a grating-like passage by a plurality of grating grooves 54.

In this embodiment, the gas passage 50 has a configuration with the turnaround portion 50B as described above. Therefore, the total passage length is increased, in comparison with a case where the passage 50 has a linear configuration. As a result, the average flow speed of the reaction gas throughout the passage increases, so that the gas utilization rate increases and the electric power generating efficiency improves. Furthermore, since the portion of the downstream-side portion 50C adjacent to the discharge hole 62 is formed as the grating-like passage, diffusion of the reaction gas is accelerated. In a downstream portion of the gas passage, a reaction gas containing a large amount of water produced by the reducing reactions flows, so that there is a danger of blockage of the gas passage due to liquefaction of water. However, the provision of the grating-like passage as described above improves the water discharging characteristic.

Furthermore, a total passage sectional area SG1 of the independent passages of the downstream-side portion 50C located near the turnaround portion 50B is set smaller than a total passage sectional area SG2 of the independent passages of the upstream-side portion 50A.

As the total passage sectional areas SG1, SG2 are set in this manner, the gas flow speed in the downstream-side portion 50C is further increased partially. Therefore, in the downstream-side portion 50C, where a reduction in the reaction gas concentration is apprehended, the gas concentration reduction is lessened as much as possible, and therefore the reaction gas utilization rate is increased. In particular, if air is used as the oxidant gas, the gas concentration (oxygen concentration) thereof is low from the beginning, so that the increase in the gas utilization rate becomes particularly remarkable at the side of the gas passage 50. Furthermore, such a gas flow speed increase also improves the water discharging characteristic of the downstream-side portion 50C, where water is likely to reside.

However, it should be noted herein that if the total passage sectional area SG1 of the downstream-side portion 50C is set to smaller values gradually, the flow passage resistance gradually increases in the downstream-side portion 50C, so that the pressure loss increases in view of the entire passage.

Furthermore, although it is desirable to relatively expand the total passage sectional area SG2 of the upstream-side portion 50A corresponding to the amount of reduction of the total passage sectional area SG1 of the downstream-side portion 50C in terms of securing a passage sectional area of the entire gas passage, such expansion of the total passage sectional area SG2 of the upstream-side portion 50A reduces the gas flow speed in the upstream-side portion 50A, thus resulting in a reduction in the power generating efficiency.

Experiments in conjunction with the invention have verified that if the ratio between the total passage sectional areas SG1, SG2 (SG1/SG2) is set within the range of:

$$0.3 < (SG1/SG2) < 1.0 \qquad \text{(expression 1)}$$

then the reduction in the power generating efficiency in the upstream-side portion 50A of the gas passage 50 and the increase in the power generating efficiency in the downstream-side portion 50C can be suitably balanced while the increase in the pressure loss is minimized. In this embodiment, therefore, the area ratio (SG1/SG2) is set to "0.7", which is within the aforementioned range.

A gas passage (fuel gas passage) for conveying a hydrogen-containing fuel gas is formed in a stacking surface (not shown) of the collector plate 10 that is opposite from the stacking surface having the oxidant gas passage 50. An end portion of the collector plate 10 has a supply hole 71 for supplying the fuel gas into the fuel gas passage, and a discharge hole 72 for discharging the fuel gas from the gas passage. When the fuel cell 30 is placed in a usable state, the supply hole 71 of the two holes 71, 72 is positioned upward in the direction of gravity, and the discharge hole 72 is positioned downward in the direction of gravity.

In this embodiment, the fuel gas passage has a configuration that is symmetrically identical to the aforementioned configuration of the oxidant gas passage 50 about a center line C that divides the collector plate 10 into equal halves. That is, the center axis C indicated in FIG. 1 serves as the axis of rotational symmetry. The supply hole 71 and the discharge hole 72 of the fuel gas passage are formed at positions that are symmetrical to the positions of the supply hole 61 and the discharge hole 62 of the oxidant gas passage 50 about the center line C. That is, the both surfaces of the collector plate 10 have identical configurations (that are not distinguishable from each other). Therefore, when the collector plate 10 is placed on a baseboard 20, there is no need to discriminate a stacking surface of the collector plate 10 having a fuel gas passage and a stacking surface thereof having an oxidant gas passage 50.

Formed between the supply hole 61 and the discharge hole 62 of the gas passage 50 in an end portion of the collector plate 10 is a supply hole 81 for supplying cooling water into a cooling water passage (not shown) that is formed in some collector plates 10. A discharge hole 82 for discharging cooling water from the cooling water passage is formed between the supply hole 71 and the discharge hole 72 of the fuel gas passage in the opposite end portion of the collector plate 10.

As shown in FIG. 3, seals 90 formed from an electrically insulating material are provided between the collector plates 10 in such a manner as to fill a gap formed around an outer periphery of each baseboard 20 between adjacent collector plates 10. Each seal 90 has holes (not shown) at positions corresponding to the positions of the holes 61, 62, 71, 72, 81, 82 of each collector plate 10. The holes of each seal 90 have substantially the same shapes as the holes of each collector plate 10. Within the stack 32, a plurality of manifolds 60A, 60B, 70A, 70B, 80A, 80B extending in the stacking direction are formed as a result of connection of the holes of the collector plates 10 and the holes of the seals 90.

More specifically, within the stack 32, a supply manifold 60A for distributing and supplying the oxidant gas into the oxidant gas passages 50, a discharge manifold 60B into which the oxidant gas is discharged from the gas passages 50 are formed. Similarly, a supply manifold 70A for distributing and supplying the fuel gas into the fuel gas passages, and a discharge manifold 70B into which the fuel gas is discharged from the gas passages are formed within the stack 32.

As described above, the discharge holes 62, 72 are positioned below the supply holes 61, 71 in the direction of gravity. Therefore, of the manifolds 60A, 60B, 70A, 70B, the discharge manifolds 60B, 70B are positioned below the supply manifolds 60A, 70b in the direction of gravity. As a result, the water contents contained in the reaction gasses within the oxidant gas passages 50 and the fuel gas passages promptly move downwards and are discharged via the discharge holes 62, 72 due to gravity besides the reaction gas supplying pressure.

Furthermore, within the stack 32, a supply manifold 80A for supplying cooling water into the cooling water passages, and a discharge manifold 80B into which cooling water is discharged from the cooling water passages are formed.

An end of each manifold 60A, 60b, 70A, 70B, 80A, 80B is closed by one of the side plates 12. The other side plate 12 has inlets 126a, 127a, 128a for supplying the reaction gases and cooling water into the supply manifolds 60A, 70A, 80A, respectively, and outlets 126b, 127b, 128b for discharging the reaction gases and cooling water from the discharge manifolds 60B, 70B, 80B, respectively.

In the fuel cell 30 of this embodiment, the passage sectional areas of the manifolds 60A, 60B for the oxidant gas, and the passage sectional areas of the manifolds 70A, 70B for the fuel gas are set so as to have the following relationship.

With regard to the manifolds 60A, 60B for the oxidant gas, the passage sectional area SO1 of the discharge manifold 60B is set greater than the passage sectional area SO2 of the discharge manifold 60B. Similarly, with regard to the manifolds 70A, 70B for the fuel gas, the passage sectional area SH1 of the discharge manifold 70B is set greater than the passage sectional area SH2 of the supply manifold 70A.

Furthermore, to establish the aforementioned relationships, similar relationships are set for the opening areas of the supply holes 61, 71 and the discharge holes 62, 72, which substantially determine the aforementioned passage sectional areas SO1, SO2, SH1, SH2. That is, the opening area of the discharge holes 62 for the oxidant gas passages 50 is set greater than the opening area of the supply holes 61 for the gas passages 50. The opening area of the discharge holes 72 for the fuel gas passages is set greater than the supply holes 71 for the fuel gas passages.

As the passage sectional areas of the manifolds 60A, 60B, 70A, 70B, and the opening areas of the supply holes 61, 71 and the discharge holes 62, 72 are set as described above, the restriction on gas flow by the constricting effects of the discharge holes 62, 72 and the discharge manifolds 60b, 70B formed as congregations of the discharge holes 62, 72 is reduced, so that the reaction gases are promptly discharged from the gas passages 50 toward the discharge holes 62, 72.

Figure 4:
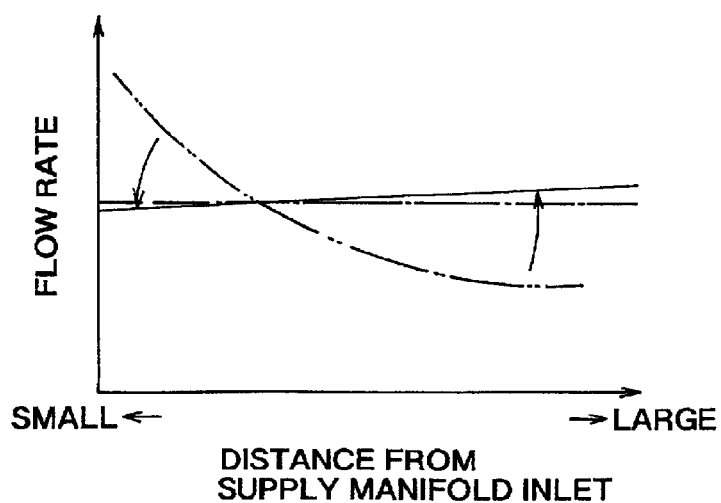
FIG. 4 is a graph indicating a relationship between the amount of flow of a reaction gas in an oxidant gas passage and the distance from the inlet of a supply manifold.

FIG. 4 is a graph indicating the amount of flow of the reaction gas (oxidant gas) in the oxidant gas passages 50, where a solid line indicates the amount of flow of the reaction gas in this embodiment, and a two-dot chain line indicates the amount of flow of the reaction gas in a comparative example in which the passage sectional area of a supply manifold 60A and the passage sectional area of a discharge manifold 60B (i.e., the opening area of each supply hole 61 and the opening area of each discharge hole 62) are set equal to each other.

The two-dot chain line in FIG. 4 indicates that in the comparative example, the amount of flow of the reaction gas considerably decreases in gas passages 50 located remotely from the inlet 126a of the supply manifold 60A, and the reaction gas is distributed in the gas passages 50 in a biased manner. Therefore, unit cells 21 remote from the inlet 126a cannot generate a predetermined electromotive force, so that a reduction in the power generating efficiency of the entire fuel cell cannot be avoided.

In contrast, in the embodiment, at least a predetermined amount of the reaction gas flows even in gas passages 50 located remotely from the inlet 126a of the supply manifold 60A, and the bias in the distribution of the reaction gas to the gas passages 50 is reduced, as indicated by the solid line in FIG. 4. This tendency is substantially the same with regard to the fuel gas passages since the fuel gas passages have substantially the same configuration as the oxidant gas passages 50. That is, bias in the distribution of the reaction gas (fuel gas) to the fuel gas passages is reduced.

According to experiments conducted by the present inventors, it has been verified that further improved distribution characteristics are secured with regard to the oxidant gas passages 50 and the fuel gas passages if the ratio between the passage sectional area SO1 of the discharge manifold 60B of the oxidant gas passages 50 and the passage sectional area SO2 of the supply manifold 60A of the gas passages 50 (SO1/SO2) is set within the range of:

$$1.0 < (SO1/SO2) < 3.0 \qquad \text{(expression 2-1)}$$

and, more preferably, within the range of:

$$1.3 < (SO1/SO2) < 2.0 \qquad \text{(expression 2-2)}$$

or if the ratio between the passage sectional area SH1 of the discharge manifold 70B of the fuel gas passages and the passage sectional area SH2 of the supply manifold 70A of the gas passages is set within the range of:

$$1.0 < (SH1/SH2) < 3.0 \qquad \text{(expression 3-1)}$$

and, more preferably, within the range of:

$$1.3 < (SH1/SH2) < 2.0 \qquad \text{(expression 3-2)}$$

Therefore, in this embodiment, the ratios between the passage sectional areas (SO1/SO2, SH1/SH2) are set to "1.5", which is within the aforementioned ranges.

As described above, according to the fuel cell 30 and the collector plates 10 of this embodiment, as the passage sectional areas SO1, SH1 of the discharge manifolds 60B, 70B (opening areas of the discharge holes 62, 72) are set greater than the passage sectional areas SO2, SH2 of the supply manifolds 60A, 70B (opening areas of the supply holes 61, 71), at least a predetermined amount of flow of the reaction gases can be achieved even in gas passages that are located remotely from the inlets 126a, 127a of the supply manifolds 60A, 70A, and the bias in the distribution of the reaction gases to the gas passages can be reduced, thereby improving the distribution characteristic.

Furthermore, each of the oxidant gas passage 50 and the fuel gas passage of each collector plate 10 has a configuration in which the passage turns around at an end portion of the collector plate 10, and the upstream-side portion 50A of each gas passage is formed as a plurality of independent passages. Therefore, the reaction gas flow speed in each gas passage can be increased, and the gas utilization rate is increased, so that the power generating efficiency can be improved. Furthermore, since a portion of each gas passage near the discharge hole 62 or 72 is formed as a grating-like passage, the water discharging characteristic can be improved. Still further, since the opening areas of the discharge holes 62, 72 are set relatively large, the water content in the gas passages can be promptly discharged, so that the water discharging characteristic will further improve.

Since each of the oxidant gas passages 50 and the fuel gas passages has a configuration in which the gas passage turns around at an end portion of the collector plate 10, and in which the total passage sectional area SG1 of the independent passages of the downstream-side portion 50C located downstream of the turnaround portion 50B is set smaller than the total passage sectional area SG2 of the independent passages of the upstream-side portion 50A, the gas flow speed in the downstream-side portion 50C is partially increased, so that the gas concentration reduction can be lessened and the power generating efficiency in the downstream-side portion 50C can be improved. Furthermore, due to such an increase in gas flow speed, the water discharging characteristic in the downstream-side portion 50C, where water is likely to reside, can be improved.

Furthermore, since the stacking direction of the stack 32 is set to a direction perpendicular to the direction of gravity, water is allowed to move downward in the direction of gravity in the grating-like passage of each gas passage 50 near the discharge hole 62, 72. Therefore, a reaction gas flow passage can be reliably secured at least in an upward portion of each collector plate 10 in the direction of gravity, thereby effectively lessening the reduction in the power generating efficiency caused by water blocking a passage.

Still further, of the manifolds 60A, 60B, 70A, 70B, the discharge manifolds 60B, 70B are positioned below the supply manifolds 60A, 70B in the direction of gravity. Therefore, water contained in the reaction gas in each gas passage 50 can be promptly moved downstream, and can be discharged via the discharge hole 62, 72 by the effect of gravity in addition to the reaction gas supplying pressure. Thus, the water discharging characteristic can be improved.

In the foregoing embodiment, the passage sectional areas of the manifolds 60A, 60B, 70A, 70B of the oxidant gas passages 50 and the fuel gas passages (opening areas of the supply holes 61, 71 and the discharge holes 62, 72) are set so as to satisfy the aforementioned relational expressions (expression 2-1), (expression 2-2), (expression 3-1), (expression 3-2). However, this is not restrictive. For example, it is also possible to set the aforementioned relationships regarding the passage sectional areas of the manifolds of the oxidant gas passages 50 or the manifolds of the fuel gas passages.

Although in the foregoing embodiment, the total passage sectional areas SG1, SG2 of the upstream-side portion 50A and the downstream-side portion 50C are set so as to satisfy the relational expression (expression 1) with regard to the oxidant gas passage 50 and the fuel gas passage of each collector plate 10, it is also possible to set the aforementioned relational expression with regard to only one of the passage sectional area of the oxidant gas passage 50 and the passage sectional area of the fuel gas passage.

Furthermore, although the foregoing embodiment is described on the assumption that each collector plate 10 is provided with the oxidant gas passage 50 and the fuel gas passage, a collector plate 10 may also have only one of the two gas passages.

The collector plate of the invention is suitable in a low-temperature type of Fuel cell that operates at temperature low enough not to completely vaporize moisture in the cell, especially for a Polymer Electrolyte Fuel Cell.

While the invention has been described with reference to what is presently considered to be a preferred embodiment thereof, it is to be understood that the invention is not limited to the disclosed embodiment or constructions. To the contrary, the invention is intended to cover various modifications and equivalent arrangements.

What is claimed is:

1. A collector plate of a fuel cell, comprising:
   a gas passage formed in at least one surface;
   a supply hole for distributing and supplying a reaction gas into the gas passage; and
   a discharge hole for discharging the reaction gas from the passage,
   wherein a sectional area of a region of the gas passage adjacent to the discharge hole is greater than a sectional area of a region of the gas passage adjacent to the supply hole, and a ratio between the opening area SA1 of the discharge hole and the opening area SA2 of the supply hole is:

$$1.0 < (SA1/SA2) < 3.0.$$

2. A collector plate of a fuel cell, comprising:
   a gas passage formed in at least one surface;
   a supply hole for distributing and supplying a reaction gas into the gas passage; and
   a discharge hole for discharging the reaction gas from the passage,
   wherein a sectional area of a region of the gas passage adjacent to the discharge hole is greater than a sectional area of a region of the gas passage adjacent to the supply hole, and the gas passage comprises:
      a first passage that leads the reaction gas supplied from the supply hole, from a first side of the collector plate where the supply hole is formed to a second side that is opposite from the first side;
      a second passage that leads the reaction gas flowing at the second side to the discharge hole formed at the first side; and
      a turnaround portion that is provided at the second side and that connects the first passage and the second passage,
      wherein a plurality of sub-passages are formed in at least a portion of the first passage and the second passage.

3. A collector plate of a fuel cell, comprising:
   a gas passage formed in at least one surface;
   a supply hole for distributing and supplying a reaction gas into the gas passage; and
   a discharge hole for discharging the reaction gas from the passage,
   wherein a sectional area of a region of the gas passage adjacent to the discharge hole is greater than a sectional area of a region of the gas passage adjacent to the supply hole, and the gas passage comprises:
      a first passage that leads the reaction gas supplied from the supply hole, from a first side of the collector plate where the supply hole is formed to a second side that is opposite from the first side;
      a second passage that leads the reaction gas flowing at the second side to the discharge hole formed at the first side; and
      a turnaround portion that is provided at the second side and that connects the first passage and the second passage,
      wherein a passage sectional area of the first passage is greater than a passage sectional area of the second passage.

4. A collector plate according to claim 3, wherein a ratio between the passage sectional area SA3 of the first passage and the passage sectional area SA4 of the second passage is:

$$0.3 < (SA4/SA3) < 1.0.$$

5. A collector plate of a fuel cell, comprising:
   a gas passage formed in at least one surface;
   a supply hole for distributing and supplying a reaction gas into the gas passage; and
   a discharge hole for discharging the reaction gas from the passage,
   wherein a sectional area of a region of the gas passage adjacent to the discharge hole is greater than a sectional area of a region of the gas passage adjacent to the supply hole,
   wherein the collector plate has a rectangular shape, and
   wherein the gas passage, the supply hole and the discharge hole are formed each one of an obverse surface and a reverse surface of the collector plate, and
   wherein the obverse surface and the reverse surface are substantially rotationally symmetrical about at least one rotational axis.

6. A fuel cell comprising:
   a stack formed by alternately stacking collector plates and units each of which is formed by an electrolyte film and reaction electrodes sandwiching the electrolyte film;
   a gas passage formed between each unit and an adjacent collector plate, within the stack;
   a supply manifold that is formed in a stacking direction of the stack and that distributes and supplies a reaction gas into each gas passage;
   a discharge manifold which is formed in the stacking direction of the stack and to which the reaction gas in each gas passage is discharged;
   wherein a passage sectional area of the discharge manifold is greater than a passage sectional area of the supply manifold.

7. A fuel cell according to claim 6, wherein a ratio between the passage sectional area SB1 of the discharge manifold and the passage sectional area SB2 of the supply manifold is:

$$1.0 < (SB1/SB2) < 3.0.$$

8. A fuel cell according to claim 6, wherein the gas passage comprises:
   a first passage that leads the reaction gas supplied from a supply hole, from a first side of the collector plate where the supply hole is formed to a second side that is opposite from the first side;
   a second passage that leads the reaction gas flowing at the second side to a discharge hole formed at the first side; and
   a turnaround portion that is provided at the second side and that connects the first passage and the second passage, wherein a portion of the second passage that is near the turnaround portion is formed as a grid of intersecting sub-passages, and a plurality of sub-passages are formed in at least a portion of the first passage and the second passage.

9. A fuel cell according to claim 8, wherein a direction in which the units and the collector plates are stacked is substantially perpendicular to a direction of gravity.

10. A fuel cell according to claim 6, wherein the gas passage comprises:
   a first passage that leads the reaction gas supplied from a supply hole, from a first side of the collector plate where the supply hole is formed to a second side that is opposite from the first side;
   a second passage that leads the reaction gas flowing at the second side to a discharge hole formed at the first side; and
   a turnaround portion that is provided at the second side and that connects the first passage and the second passage,
   wherein a passage sectional area of the first passage is smaller than a passage sectional area of the second passage.

11. A fuel cell according to claim 10, wherein a ratio between the passage sectional area SB3 of the first passage and the passage sectional area SB4 of the second passage is:

$$0.3<(SB4/SB3)<1.0.$$

12. A collector plate of a fuel cell, comprising:
   a gas passage formed in at least one surface;
   a supply hole for distributing and supplying a reaction gas into the gas passage; and
   a discharge hole for only discharging the reaction gas from the passage, whose opening area is greater than an opening area of the supply hole,
   wherein the gas passage comprises:
      a first passage that leads the reaction gas supplied from the supply hole from a first side of the collector plate where the supply hole is formed to a second side that is opposite from the first side;
      a second passage that leads the reaction gas flowing at the second side to the discharge hole formed at the first side; and
      a turnaround portion that is provided at the second side and that connects the first passage and the second passage,
      wherein a passage sectional of the first passage is greater than a passage sectional area of the second passage.

13. A collector plate according to claim 12, wherein a ratio between a passage sectional area SA3 of the first passage and the passage sectional area SA4 of the second passage is: $0.3<SA4/SA3)<1.0$.

14. A fuel cell comprising a collector plate, the collector plate having:
   a gas passage formed in at least one surface;
   a supply hole for distributing and supplying a reaction gas into the gas passage; and
   a discharge hole for discharging the reaction gas from the passage,
   wherein a sectional area of a region of the gas passage adjacent to the discharge hole is greater than a sectional area of a region of the gas passage adjacent to the supply hole.

15. A fuel cell comprising a collector plate, the collector plate having:
   a gas passage formed in at least one surface;
   a supply hole for distributing and supplying a reaction gas into the gas passage, where the supply hole constitutes a portion of a supply manifold supplying the reaction gas into a stack formed by stacking a plurality of the collector plates; and
   a discharge hole for discharging the reaction gas from the passage, where the discharge hole constitutes a portion of a discharge manifold for discharging the reaction gas out of the a stack,
   wherein an opening area of the discharge hole is greater than an opening area of the supply hole.

* * * * *